(12) United States Patent
Nasshan et al.

(10) Patent No.: US 8,967,725 B2
(45) Date of Patent: Mar. 3, 2015

(54) BACKREST, IN PARTICULAR FOR A REAR SEAT ARRANGEMENT OF A MOTOR VEHICLE

(75) Inventors: Juergen Nasshan, Kaiserslautern (DE); Joachim Muehlberger, Obersueizen (DE); Anton Niedermeier, Saarbruecken (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 377 days.

(21) Appl. No.: 13/502,724

(22) PCT Filed: Aug. 27, 2010

(86) PCT No.: PCT/EP2010/005262
§ 371 (c)(1),
(2), (4) Date: Jun. 29, 2012

(87) PCT Pub. No.: WO2011/047748
PCT Pub. Date: Apr. 28, 2011

(65) Prior Publication Data
US 2012/0261956 A1 Oct. 18, 2012

(30) Foreign Application Priority Data

Oct. 20, 2009 (DE) .......................... 10 2009 050 839

(51) Int. Cl.
*B60N 2/68* (2006.01)
*B60N 2/36* (2006.01)
*B60N 2/42* (2006.01)
*B60N 2/427* (2006.01)

(52) U.S. Cl.
CPC ................ *B60N 2/686* (2013.01); *B60N 2/366* (2013.01); *B60N 2/4214* (2013.01); *B60N 2/42709* (2013.01)
USPC .................................................... 297/452.18

(58) Field of Classification Search
CPC ........................................................ B60N 2/68
USPC .................................................... 297/452.18
See application file for complete search history.

(56) References Cited

U.S. PATENT DOCUMENTS

| 5,984,419 A | 11/1999 | Partington et al. |
| 7,137,670 B2 | 11/2006 | Gupta et al. |

(Continued)

FOREIGN PATENT DOCUMENTS

| CN | 1688434 | 10/2005 |
| CN | 101039819 | 9/2007 |

(Continued)

OTHER PUBLICATIONS

Japanese Office Action mailed Aug. 13, 2013.

(Continued)

*Primary Examiner* — Anthony D Barfield
(74) *Attorney, Agent, or Firm* — Fletcher Yoder, P.C.

(57) ABSTRACT

A backrest for a vehicle has a shell reaching over at least two seats. The shell has a support structure that completely surrounds the shell on the adjacent sides and partially surrounds the shell on sides adjoining the adjacent sides. Starting from a common corner of the adjacent sides an end of one of the partially surrounding sides is arranged obliquely. This end terminates in an intermediate region between the same. The support structure connects upper and lower connecting points of the shell.

17 Claims, 7 Drawing Sheets

(56) References Cited

U.S. PATENT DOCUMENTS

| | | | |
|---|---|---|---|
| 7,300,102 B2 | 11/2007 | Gupta et al. | |
| 7,422,289 B2 | 9/2008 | Kim et al. | |
| 7,470,388 B2 | 12/2008 | Hüsler et al. | |
| 7,635,165 B2 * | 12/2009 | Robert et al. | 297/452.18 |
| 7,891,740 B2 * | 2/2011 | Boes | 297/452.18 |
| 2008/0191539 A1 | 8/2008 | Teufel et al. | |

FOREIGN PATENT DOCUMENTS

| | | |
|---|---|---|
| DE | 3433996 A1 | 3/1986 |
| DE | 4208150 A1 | 6/1993 |
| DE | 19625785 A1 | 1/1997 |
| DE | 10321289 A1 | 12/2004 |
| DE | 102006012699 A1 | 9/2007 |
| DE | 10 2007 007 296 A1 | 8/2008 |
| DE | 102007041222 A1 | 3/2009 |
| EP | 1647442 A2 | 4/2006 |
| EP | 1880897 | 1/2008 |
| EP | 1916440 A2 | 4/2008 |
| JP | 09-254689 | 9/1997 |
| JP | 2005538864 | 12/2005 |
| WO | 2004024424 A1 | 3/2004 |
| WO | 2004024426 | 3/2004 |
| WO | 2004024426 A1 | 3/2004 |

OTHER PUBLICATIONS

International Search Report for application No. PCT/EP2010/005262 mailed Dec. 6, 2010.
German 1st Office Action mailed Jun. 18, 2010.
Chinese Office Action dated Aug. 21, 2013, 6 pgs.
German Office Action of DE 10 2009 050 839.2 dated Jul. 11, 2013, 6 pgs.
Chinese Office Action dated Apr. 10, 2014.

* cited by examiner

BACKREST, IN PARTICULAR FOR A REAR SEAT ARRANGEMENT OF A MOTOR VEHICLE

CROSS REFERENCE TO RELATED APPLICATIONS

This application claims priority from and the benefit of PCT Application No. PCT/EP2010/005262, filed on Aug. 27, 2010, and German Patent DE 10 2009 050 839.2, filed on Oct. 20, 2009; both entitled "Backrest, In Particular for a Rear Seat Arrangement of a Motor Vehicle", which are herein incorporated by reference.

BACKGROUND

The invention relates to a backrest, in particular for a rear seat arrangement of a motor vehicle.

The second or, optionally, first seat rows of vehicles are generally configured in such a manner that the backrest is of multi-part design. A division is customary here, according to which part of the backrest extends over two seats.

DE 103 21 289 A1 discloses a backrest of an individual seat for a motor vehicle, the backrest consisting of a shell with a cushion and of a sheetlike outer shell for covering the shell rear side which faces away from the cushion. Shell and outer shell are connected to each other along the border regions thereof, thus forming a supporting structure consisting of a plurality of hollow profiles. Shell and outer shell may be composed of fiber reinforced plastics.

A seat back for two seats is known from DE 196 25 785 A1. This laid-open application relates to a seat back which is suitable for a motor vehicle, in particular a rear seat bench back, composed of fiber reinforced plastic. Since seat backs in motor vehicles are safety-relevant components, a construction composed of fiber reinforced plastic and with omission of the metal frame or of the metal plate was previously possible only with complicated constructions. In order to produce the seat back, a semifinished product is produced from a textile fabric, which contains plastics fibers and reinforcing fibers present in folded, corrugated and/or crimped form, by deforming and consolidating the plastics fibers. Locally reinforced regions of a shape which is substantially X-, Y- or V-shaped, are placed into the textile fabric.

Another backrest, which is disclosed in DE 42 08 150 A1, also for an individual seat has a supporting structure composed of a fiber reinforced plastic, wherein two bending supports running parallel to each other are connected to each other via a transverse support and/or at least via one diagonal support in such a manner that, even with a unilateral loading of one bending support, the other bending support jointly carries the loading.

DE 10 2006 012 699 A1 discloses a three-dimensional structure, for example of a motor vehicle seat back, which has a region composed of plastic reinforced by undirected long fibers and a region composed of a plastic reinforced by multi-dimensionally directed long fibers.

EP 1 916 440 A2 discloses a structural component composed of fiber reinforced thermoplastic. Said structural component has an endless fiber strand which reaches as far as a force introduction point, and a compact metallic deformation element which serves as a holder and is connected at the force introduction point to the structural component and at a connection point to a supporting structure.

SUMMARY

The invention is based on the object of improving a backrest. This object is achieved according to the invention by a vehicle seat with the features of claim 1. Advantageous refinements are the subject matter of the dependent claims.

According to the invention, a backrest is provided, in particular for a rear seat arrangement of a motor vehicle, which has a shell which has a width reaching over at least two seats, and has at least two lower and at least one upper connecting point, wherein the shell has a base matrix composed of a thermoplastic, and is formed with a supporting structure which is of a shape which completely surrounds the backrest on two sides adjacent to each other and partially surrounds said backrest in a directly adjoining manner on each of the sides adjoining said sides, and, from the common corner of the sides which are adjacent to each other and are completely surrounded on the outside by the supporting structure, is arranged in an obliquely running manner as far as the end, which ends in the intermediate region of the seats, of the side which is partially surrounded by the supporting structure, and the supporting structure connects the three connecting points to one another.

A backrest configured in such a manner is suitable, inter alia, for retaining the load in the trunk, in particular in the event of a crash.

Suitable materials for the base matrix composed of a thermoplastic include, in particular, polypropylene and polyamide. The plastics of the base matrix may be reinforced (continuously or in regions) with short and/or long fibers.

In the present case, fibers with a length of less than 1 mm are referred to as short fibers, with a length of 1 to 50 mm, in particular preferably of approx. 20 mm, as long fibers, and with a length of more than 50 mm as endless fibers.

The supporting structure is formed at least in regions by ribs which project to the rear.

In particular, the shell preferably has a profile which is rearwardly open at least in regions.

A rear shell can be fitted on the shell from behind. The rear shell serves here to close the profile, and therefore, in conjunction with the rear shell, in particular by means of ribs running next to one another, a closed hollow profile having corresponding improved properties with regard to bending and torsional rigidity is formed.

The rear shell is preferably formed from a base matrix composed of thermoplastic with or without short and/or long fiber reinforcement. By this means, the rear shell has sufficient stability in order, in the flat floor position, to be able to absorb loadings caused by a load without incurring damage.

In addition to the supporting structure ribs which are formed on the shell, further ribs can be provided on the shell, but the latter ribs differ in terms of the dimensions thereof (in particular height, thickness), the construction thereof (for example embedding of reinforcements in the base matrix) and/or in the arrangement thereof (for example spacing of two ribs running in parallel, transverse ribs) and in particular in respect of the function thereof with regard to ribs which are optionally adjacent and run parallel, in that the moments of resistance against bending and torsion of the ribs of the supporting structure are greater than those of the further ribs which do not belong to the supporting structure. It is thus possible to provide, for example, individual ribs which run transversely, ensure the spacing between shell and rear shell and do not belong to the supporting structure.

The supporting structure preferably has an endless fiber reinforcement, in particular endless fibers which are embedded into the material of the base matrix of the remaining part of the shell.

As an alternative or in connection therewith, inserts made of a semifinished product composed of a long and/or endless fiber reinforced plastic can be embedded into the base matrix, and/or the semifinished product can be surrounded at least in regions by the base matrix.

An insert of this type may be a tube of C-shaped design, in particular a rolled tube, which extends over a partial region of the supporting structure.

The insert may alternatively also be formed from a different material, such as, in particular, a metal, in particular preferably steel. Said inserts can be connected to the base matrix with a cohesive material joint or in an interlocking and/or frictional manner.

The semifinished product preferably forms at least one bolt-shaped region which can interact with a holder. Said region may be formed by corresponding deformation of the semifinished product, but also in any other manner.

Even if the shell is configured without a semifinished product, at least one bolt-shaped region in the shape of a rotary bearing bolt can be formed on the shell, said region being formed in particular from the material of the supporting structure or from the material of the base matrix.

The material of the base matrix, in particular polypropylene and polyamide, may also be provided with short and/or long fibers, but endless fibers are preferably arranged exclusively in the region of the supporting structure.

The shell has, preferably in the region of the upper connecting point, a receptacle for a backrest lock. Said receptacle can be designed to be open upward, and therefore the backrest lock can be inserted in an interlocking manner. Toward the side, an opening is provided in the shell, through which opening, for example, a bracket of a holder fixed on the vehicle structure can be introduced and can be locked in the backrest lock.

In particular, the receptacle is preferably reinforced by a semifinished product which at least partially surrounds the receptacle and is part of the supporting structure. As a result, forces can simply be conducted from the backrest into the vehicle structure, wherein, in the region of the backrest, a distribution of force which is as uniform as possible is possible via the supporting structure and, as a result, loading peaks can be absorbed and distributed. For this purpose, the semifinished product is preferably arranged in the manner of a band in or around the material forming the receptacle, and the band is guided in the upper region of the backrest as far as the other side of the seat where it is connected to the upper end of the obliquely running region of the supporting structure. In this case, said band-like region of the semifinished product surrounds the backrest lock, which is arranged in the receptacle, preferably over the entire extent. In particular, two band-like regions are preferably provided, wherein one region is arranged above and one region below a locking opening into which part of a holder which is fixed on the vehicle structure can be introduced.

An opening in the form of a hatch is preferably formed in the backrest, said opening being closed by a suitable component during use as a seat or in the flat floor position.

The opening is arranged here on that side of the backrest which is opposite the upper connecting point.

The backrest obtains optimum strength if the opening is bordered on the rear side of the shell by a rib which is connected, at least in an upper corner region, to the supporting structure, which is formed by further ribs. Although the rib bordering the opening does not form part of the actual supporting structure, it is directly connected thereto, and therefore forces can be conducted further.

The outer, upper corner region and the inner, lower corner region of the shell may be connected to an additional rib. However, said rib does not contribute (substantially) to increasing the rigidity but merely ensures the spacing between shell and rear shell. In this case, it is possible, for example, for said additional rib to be formed so as to be thinner than the ribs of the supporting structure. Furthermore, said additional rib can be formed, for example, exclusively from the material of the base matrix while the ribs of the supporting structure can be reinforced by fibers. As an alternative, other spacers can also be provided, in particular intersecting ribs, pins, cylinders, hollow cylinders or honeycombs.

In a preferred refinement, the additional rib crosses the obliquely running ribs of the supporting structure in the form of a transverse rib.

The obliquely running region of the supporting structure is particularly preferably formed by two ribs running spaced apart next to each other, a windup mechanism for a seatbelt being able to be arranged at the upper end between the ribs. The ribs running spaced apart next to each other particularly preferably run parallel to each other at least in a partial region. They can be connected to each other at regular or irregular spacings by transverse ribs, wherein the transverse ribs do not necessarily have to be designed to be as high over the entire length as the ribs.

In particular, the predetermined deformation point or predetermined breaking point is preferably formed on one of the ribs. In this case, the predetermined deformation point or predetermined breaking point can be formed by material weakening and/or openings in the material, in particular by a perforation. The arrangement of the material weakening and/or openings in the material is preferably concentric with respect to the central longitudinal axis of the bolt-shaped region.

The backrest connection preferably has a screw bolt which forms the bolt-shaped region and is screwed into a threaded bushing. In particular, the threaded bushing is preferably arranged in a longitudinally displaceable manner in a guide sleeve. This ensures a predetermined direction of movement in the event of the backrest connection being overloaded.

The guide sleeve is preferably arranged, at least at the two end regions, in ribs of the backrest. In this case, the guide sleeve can simply be cast into the material during the production of the backrest, in particular of a shell of same. Retrospective fitting is also possible.

The threaded bushing preferably has a flange region which is in contact with a transverse rib, wherein the flange region is arranged adjacent to the predetermined deformation point or predetermined breaking point formed in said transverse rib.

The backrest is preferably used in conjunction with holders which are fixed on the vehicle structure and supports the backrest rigidity profile, which is influenced by the supporting structure.

DRAWINGS

The invention is explained in more detail below with reference to a number of exemplary embodiments which are illustrated in the drawing, in which.

DETAILED DESCRIPTION

The direction details used below are defined by the normal installation situation in a vehicle, wherein the backrest is arranged in a position suitable for sitting. In this case, the normal direction of travel corresponds to "in front".

A backrest 1 of a rear seat arrangement (illustrated schematically in FIG. 11) of a motor vehicle has a shell 2, wherein the shell 2 is provided with upholstery and a cover. Of course, any elements increasing the comfort and/or the safety, for example inflatable air cushions, airbags, a ventilating means or an air extraction means, may be integrated into the upholstery. In the present case, the backrest 1 is designed for two seats.

Figure 1:
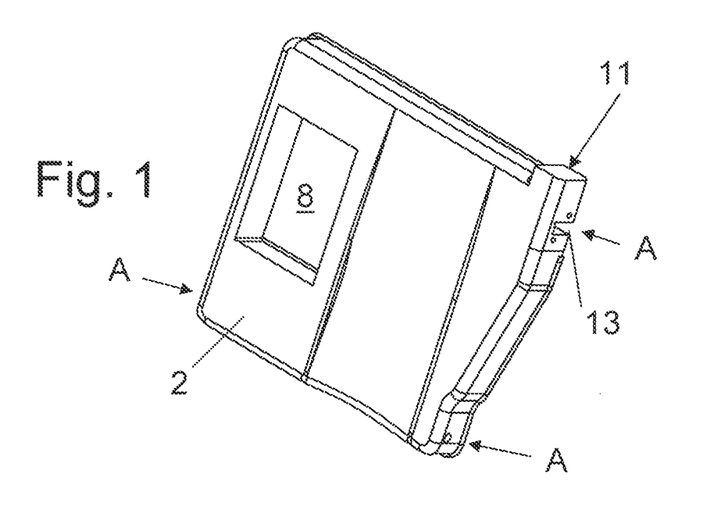
FIG. 1 shows a perspective view obliquely from the front of a backrest of a rear seat arrangement with a backrest lock connection according to the first exemplary embodiment.
Figure 2:
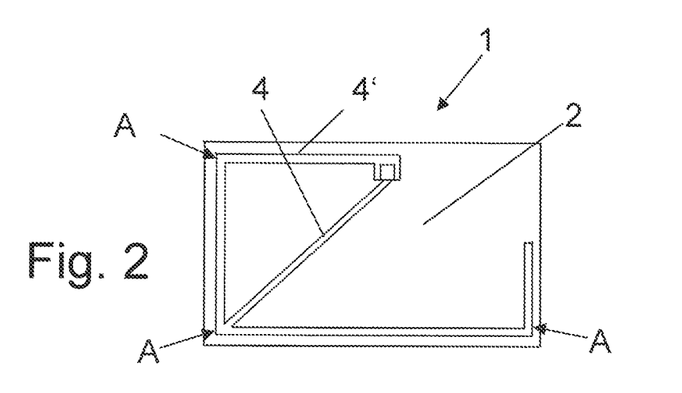
FIG. 2 shows a schematic illustration of the supporting structure.

The shell 2 according to FIG. 1 is provided as a single piece with a supporting structure 4', which is formed by a plurality of ribs 4, on the rear side thereof, which side is arranged at the rear. FIG. 2 shows in highly schematized form the profile of the supporting structure 4', which profile also applies to the backrests 1 described further on.

Connecting points A, to which holders can be fitted laterally, are provided at the top and bottom of the shell 2. Said holders, which will be discussed in more detail further on, enable the shell 2 to be connected to the vehicle structure (not illustrated here).

The supporting structure 4' completely surrounds the backrest 1 on two sides adjacent to each other and partially surrounds said backrest in a directly adjoining manner on each of the sides adjoining said sides. Furthermore, from the common corner of the sides, which are adjacent to each other and are completely surrounded on the outside by the supporting structure 4', the supporting structure 4' is arranged in an obliquely running manner as far as the end, which ends in the intermediate region of the seats, of the side which is partially surrounded by the supporting structure 4'. Furthermore, the supporting structure 4' connects the three connecting points A to one another.

As can be seen in FIG. 1, the upper, outer corner of the shell 2 is designed as an upwardly open receptacle 11 into which said backrest lock 12, which interacts with the upper holder 5, is inserted. With regard to the geometry of the receptacle 11 per se, reference is made to the illustration of FIG. 8 which differs from the illustration of FIG. 1 only with regard to the configuration of the supporting structure 5'. The receptacle 11 is designed in the shape of a rectangular tube and so as to be open upward and project upward over the upper side of the backrest 1, wherein a cross-sectional reduction is provided downward in order to restrict the insertion depth of the backrest lock 12. The backrest lock 12 is introduced from above in a substantially interlocking manner into the receptacle 11 and is secured therein, for example by means of frictional elements. The locking region 12' (cf. FIG. 8) of the backrest lock 12 projects here into the region of reduced cross section, wherein the latter ends level with a locking opening 13 through which the locking region of the upper holder 5, which region is formed by said bracket 5', can be inserted into the backrest lock 12 and can be locked therein in order to secure the upright position of the backrest 1.

The front side, which is arranged in front, is designed to be optimized in terms of comfort in the region of the outer seat. Said region is contoured in such a manner that a relatively small foam material thickness is required and therefore foam material can be saved. The front side is of flat design in the region of the central seat, wherein an opening 8 with a rectangular cross section is provided, which opening can be closed by an element (not illustrated). The entire front side of the shell 2 has a substantially smooth surface on which the upholstery can be fitted. In order to fix a foam part in place, certain contours may be incorporated into said smooth surface.

The shell 2 according to the backrest 1 in the present case and the backrest 1 described below consists of a thermoplastic base matrix, in the present case composed of polyamide, or, according to one alternative, of polypropylene. The base matrix can be reinforced, completely or at least in regions, with short fibers or long fibers. Endless fiber reinforcements are also conceivable in the region of the supporting structure 4'.

As an alternative or in conjunction with endless fibers, reinforcements having long and/or short fibers, and/or metallic inserts are also possible in the region of the supporting structure 4'. Similarly, in the event of a suitable configuration, reinforcements in the form of inserted materials, such as fibers or metal elements, may be omitted, i.e. only the material of the base matrix is provided.

Figure 3:
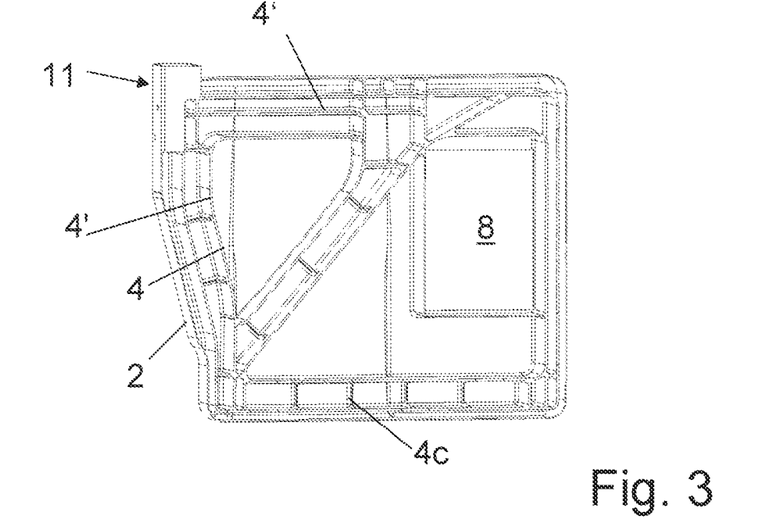
FIG. 3 shows a slightly perspective view of the shell of a backrest with a backrest lock connection according to the second exemplary embodiment.

FIG. 3 shows a second backrest 1. In this case, the same reference numbers as in the first exemplary embodiment are used for identical or identically acting elements. The supporting structure 4' of the shell 2 according to the backrest 1 of FIG. 3 consists, at least predominantly, of a base matrix which does not have an endless fiber reinforcement and manages without insert-molded metallic inserts. The profile of the ribs 4 on the rear side of the shell 2 substantially corresponds to that of the first exemplary embodiment, but additional transverse ribs 4c are provided between the rib groups extending along the sides and diagonally and running parallel to one another, in order to increase the stability.

Figure 4:
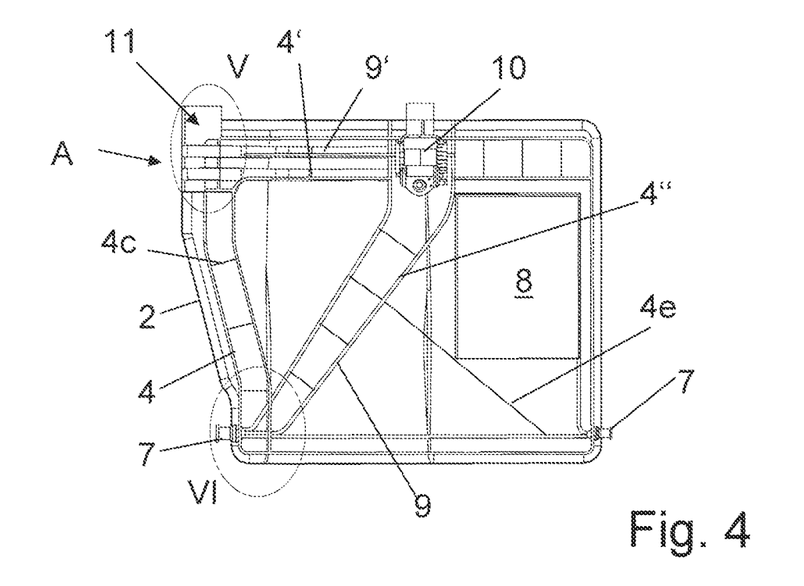
FIG. 4 shows a rear view of the shell of a backrest with a backrest lock connection according to the third exemplary embodiment.
Figure 5:
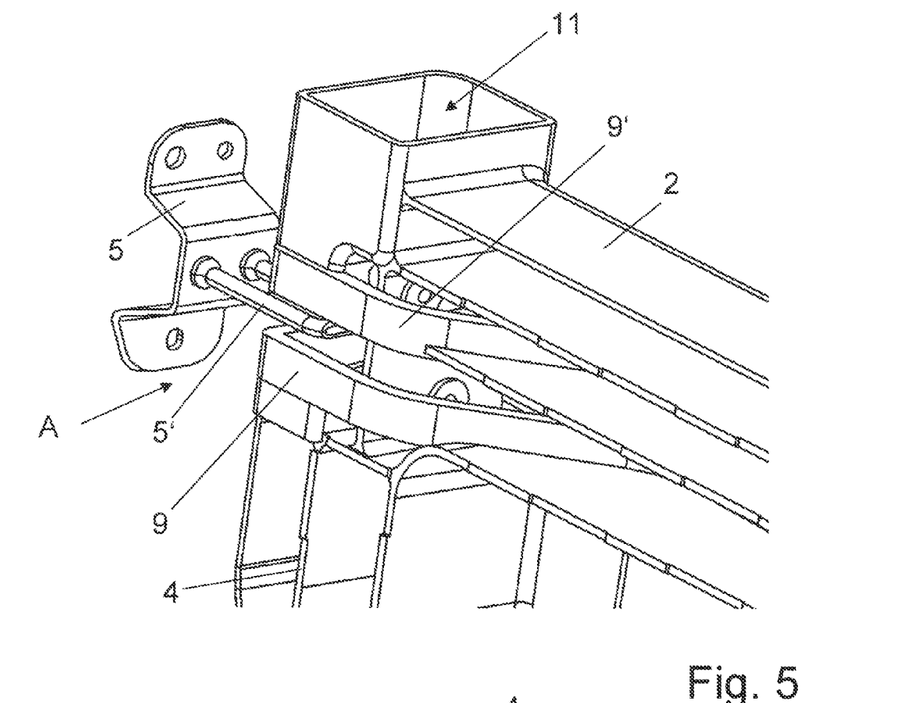
FIG. 5 shows a perspective detailed view of the detail V from FIG. 4 with a holder.
Figure 6:
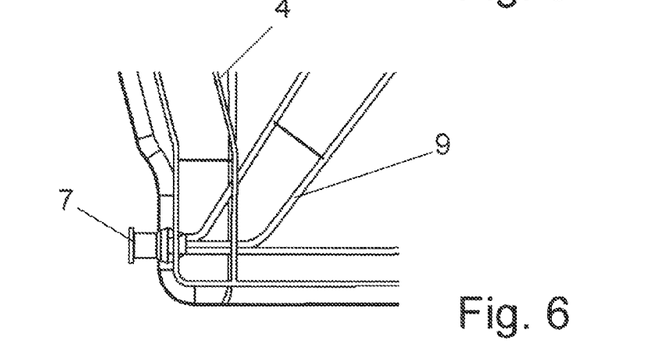
FIG. 6 shows a detailed view of the detail VI from FIG. 4.

FIGS. 4 to 6 show, as a third backrest 1, a further shell 2 which is modified in relation to the previously described, second backrest 1. In this case, the supporting structure 4' of the shell 2 according to FIGS. 4-6 is designed as a hybrid component, having a base matrix and an endless fiber reinforced long fiber thermoplastic semifinished product, referred to below as semifinished product 9, which is firmly embedded into the base matrix. In this case, the semifinished product 9 is entirely or partially surrounded, for example, by transverse ribs 4c which are formed from the base matrix.

The semifinished product 9 absorbs forces and moments occurring in the supporting structure 4' in particular in the event of a crash.

The reinforcement here runs between the bolt-shaped regions 7 for the lower holders (not illustrated here), which are themselves also formed by the semifinished product 9 (see FIG. 6), in the region of an obliquely running reinforcing rib 4", the function of which is completely taken over by the semifinished product 9, and in the region of the upper side of the backrest between the outside where the connection of an upper holder 5 (see FIG. 5) is reinforced by the semifinished product 9, and the inside of the outer seat, where a windup mechanism 10 of a seatbelt is fitted on the rear side of the shell 2.

Furthermore, a reinforcement formed by the semifinished product 9 is provided between the inside bolt-shaped region 7 and the inside lower corner of the opening 8, wherein the bolt-shaped regions 7 are directly formed by the semifinished product 9. As is apparent from FIG. 6, the semifinished product 9 protrudes laterally in the region of the bolt-shaped region 7, wherein the individual strands of the semifinished product 9 are arranged running through and embedded by individual ribs 4. The bolt-shaped regions 7 are formed directly from the converging strands of the semifinished product 9 by means of correspondingly deformed regions.

As an alternative, instead of the endless fiber reinforced thermoplastic semifinished product, or in addition thereto, a metallic reinforcement, in particular composed of steel, may also be provided.

In addition, an obliquely running rib 4e is provided from the material of the base matrix, said rib extending below the opening 8 as an extension of one of the transverse ribs 4c of the obliquely running reinforcing ribs 4" and the semifinished product 9. Said rib 4e serves merely to ensure the spacing between shell 2 and a cover or an optionally fitted rear shell (cf. FIG. 10) and does not have any function with regard to the rigidity of the backrest 1.

As is apparent from FIG. 5, the upper outside corner of the shell 2 is designed as an upwardly open receptacle 11 into which a backrest lock 12 (cf. FIG. 8) is inserted. In the region in which a bracket 5' of the upper holder 5, which is fixed on the vehicle structure, can be introduced into the backrest lock, two bands 9' which are formed by the semifinished product 9 are embedded in the manner of a band and above and below the bracket 5' into the receptacle 11, said bands, running between the ribs 4 and being partially cast into the ribs 4, which are formed from the base matrix, being guided as far as the outside reinforcing rib 4" and being connected integrally thereto. The bands 9' serve in particular to absorb and further conduct tensile forces from the backrest lock-backrest connecting point.

In the case of this above-described backrest 1, the supporting structure 4' is therefore formed both by ribs 4, which are formed from the base matrix and are arranged running substantially in the region of the sides of the shell 2, and by the semifinished product 9, which runs partially parallel and partially obliquely to the ribs 4, wherein the semifinished product 9 in the present case is embedded into the base matrix.

Figures 7, 8:
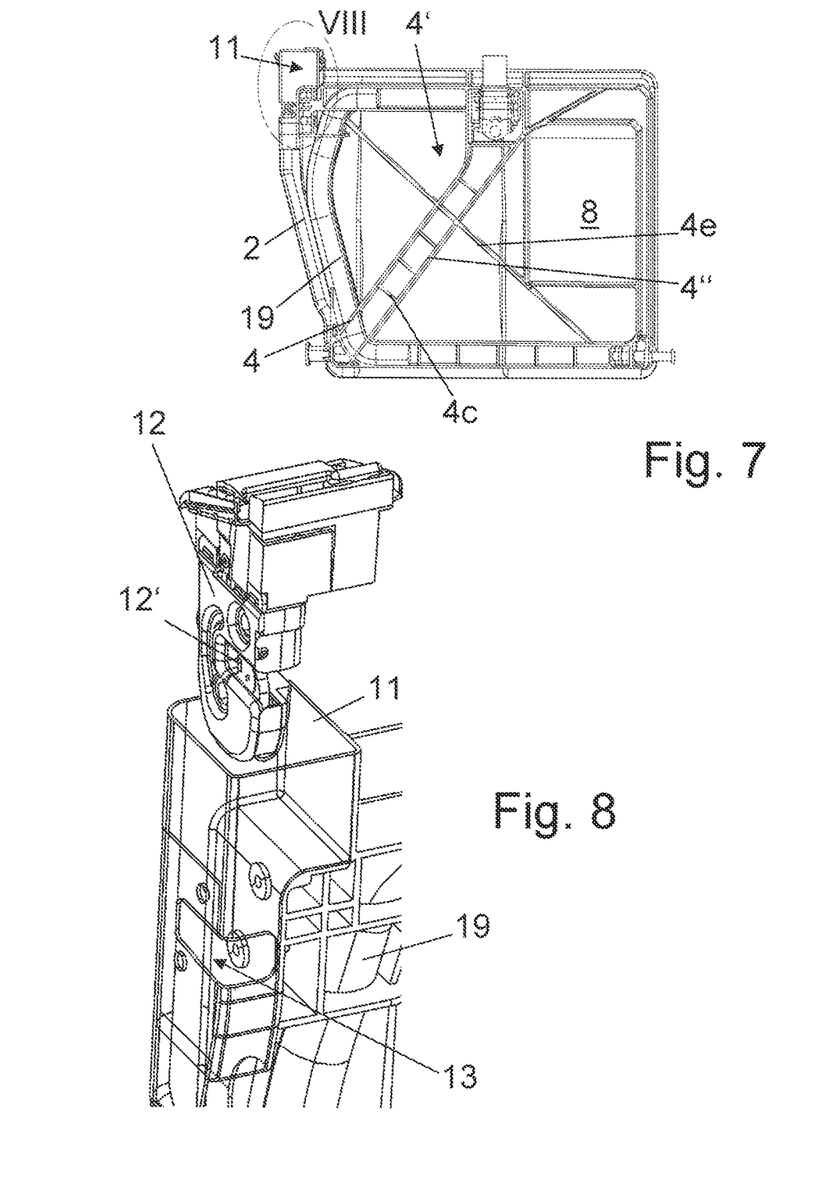
FIG. 7 shows a slightly perspective view of the shell of a backrest with a backrest lock connection according to the fourth exemplary embodiment.
FIG. 8 shows a detailed view of the detail VIII from FIG. 7.

According to the fourth backrest 1, which is illustrated in FIGS. 7 and 8, a hybrid component is again provided as the shell 2, wherein, in the present case, a rolled tube 19 of C-shaped design is embedded into the base matrix. In this case, the tube 19 is again entirely or partially surrounded by the ribs 4 from the base matrix. The tube 19 is arranged here merely on the outside of the outer seat, wherein the tube is arranged running between the two inner ribs 4 and the two ends thereof extend approximately parallel to the horizontally running ribs 4. The tube 19 here absorbs in particular torsion moments in said region of the supporting structure 4'. In this case, the rolled tube 19 may be embedded into the base matrix of the shell 2, as provided according to the present backrest 1. As an alternative, the tube 19 may be entirely or partially enclosed by ribs 4 which are formed from the base matrix.

In addition to the reinforcing ribs 4" running at the bottom of the outside to obliquely on the inside on the outer seat side, an individual rib 4e is provided running from the top of the outside to the bottom on the inside, approximately centrally below the opening 8. The rib 4e serves again exclusively to maintain the spacing between the shell 2 and a cover or an optionally fitted rear shell 3 (cf. FIG. 10) and, in the present case, does not have any relevant function with regard to the rigidity.

Figures 11, 12:
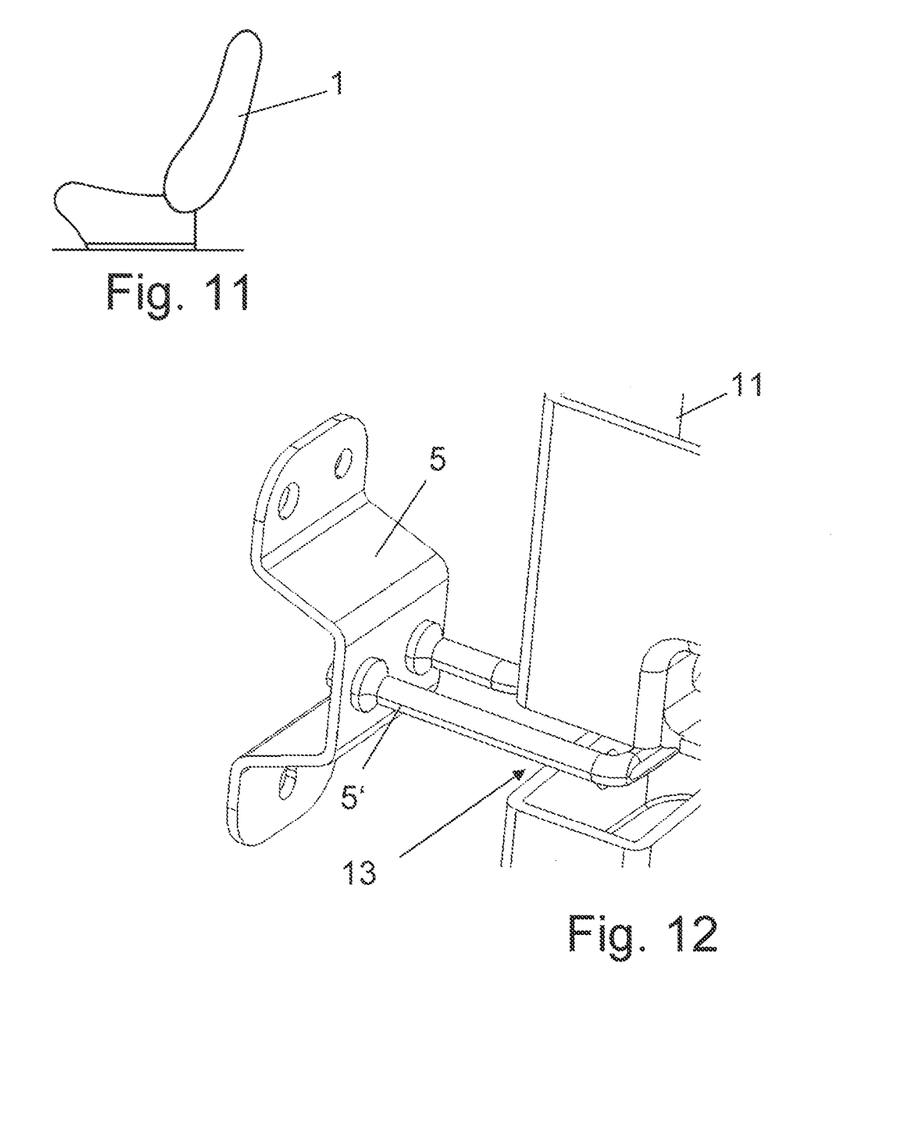
FIG. 11 shows a schematic illustration of a vehicle seat of a rear seat arrangement.
FIG. 12 shows a detailed view of an upper connecting point of the backrest to the vehicle structure with an illustration of a holder which interacts with the backrest lock and is fixed on the vehicle structure.

Also in the case of this shell 2, a receptacle 11 for a backrest lock 12 is formed at the upper end of the outside. In all configurations of the backrest, said receptacle 11 can be designed so as to correspond to one another, wherein, of course, reinforcing structures, such as, for example, in the backrest 1 described second, may also be embedded. Similarly, by means of the choice of the material of the base matrix (overall or only in this region) and of the optionally provided fiber materials, the dimensional stability and load-bearing capacity can be influenced. The receptacle 11 is designed in the shape of a rectangular tube and so as to be open upward and so as to protrude upward over the upper side of the backrest 1, a cross-sectional reduction being provided in order to restrict the insertion depth of the backrest lock 12. The backrest lock 12 is introduced from above in an interlocking manner into the receptacle 11 and is secured in same, for example by means of frictional elements. The locking region 12' of the backrest lock 12 projects here into the region of reduced cross section, wherein it ends level with a locking opening 13 through which a locking region, which is formed by a bracket 5', of an upper holder 5 can be inserted into the backrest lock 12 and locked in same in order to secure the upright position of the backrest 1. FIG. 12 shows by way of example a perspective illustration of a receptacle 11 without a backrest lock, and the bracket 5' of the holder 5, which bracket is arranged in the locking opening 13.

Figure 9:
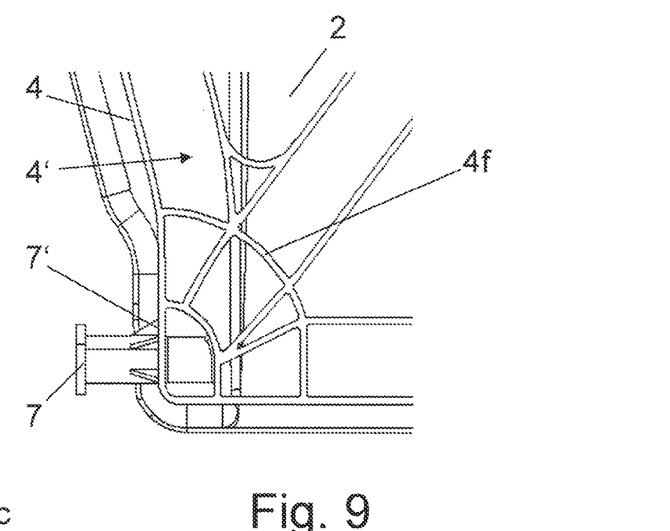
FIG. 9 shows a detailed view of a corner region of a backrest according to the fifth exemplary embodiment.

FIG. 9 shows a lower outside corner of a shell 2 according to the fifth backrest 1, wherein, in the present case, the part (not illustrated) of the shell 2 substantially corresponds to the shell of the second backrest 1, but may also be designed differently. In this case, the bolt-shaped region 7 is reinforced in the connection thereof to the supporting structure 4' via a fan-like rib structure with connecting ribs running in an arc-shaped manner. Furthermore, supporting ribs 7' are arranged on the outside of the bolt-shaped region 7 in a manner distributed around the circumference. In this case, the connecting point is integrally formed in the region of the shell 2 composed of the material of the thermoplastic base matrix, which material is reinforced by short and/or long fibers.

Figure 10:
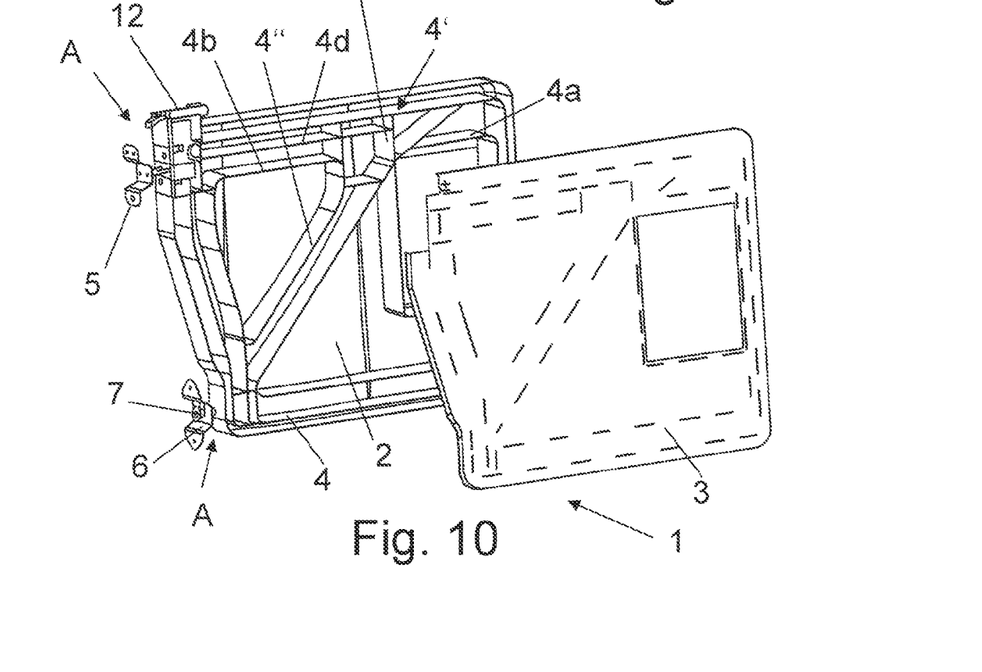
FIG. 10 shows an exploded, perspective view of a backrest from the rear, wherein the backrest has a rear shell fitted from the rear.

FIG. 10 shows a view of a backrest 1 which has a rear shell 3. In this case, the rear shell 3 may be provided with a cover, but a decorative shell may optionally also be provided, or a decorative surface may be formed directly on the rear side of said rear shell. The rear shell 3 here has suitable contours for fastening a cushion/material and beading for an increased load-bearing capacity of the loading floor. According to the present exemplary embodiment, the rear shell 3 is composed of a thermoplastic base matrix, in the present case of polyamide, or, according to one alternative, of polypropylene which is fiber reinforced. In this connection, long fiber reinforcements are provided in the present case. As an alternative or in conjunction with long fibers, reinforcements with short fibers are also possible, or the fiber reinforcement may be entirely omitted.

The outermost rib 4 of the shell 2 serves here in particular to terminate the profile after fitting together with the rear shell 3 which has a corresponding, encircling border region. The shell 2 and rear shell 3 are fixedly connected to each other in the region of the free end of the ribs 4, wherein the connecting regions on the rear shell 3 are illustrated in FIG. 10 by dashed lines. In the present case, the connection is produced by a cohesive material joint by means of ultrasonic welding, but the connection of the two shells may take place in any other suitable manner, in particular with a cohesive material joint and/or in an interlocking manner, but also in a frictional manner, for example by means of other welding processes, by means of adhesive bonding or by means of gripping from behind, wherein the protruding regions may also be used for a cohesive material joint brought about after the positioning. An opening corresponding to the opening 8 in the shell 2 is also formed in the rear shell 3.

A rear shell may be provided in all of the backrests 1 described here. The shell here contains the basic supporting structure (cf. FIG. 2). In the event of provision of a rear shell, the latter optionally closes a rearwardly open profile of the shell. In this case, in order to ensure the spacing of shell 2 and rear shell 3, spacers can be provided, for example in the form of ribs 4e, as illustrated, for example, in FIG. 4 and FIG. 7. Any other suitable elements can also serve as spacers.

Furthermore, upper holders 5 and lower holders 6 are fitted laterally to the shell 2 and enable the shell 2 to be connected to a vehicle structure (not illustrated here). In this case, the holders 5, 6 for their part are fixedly connected to the vehicle structure by means of screws (not illustrated).

In the present case, in the upper region of the backrest 1, a holder 5, the configuration and function of which will be discussed in more detail later on in conjunction with the backrest 1, is provided only on the outside of the vehicle.

In the lower region of the backrest 1, two holders 6 are provided on opposite sides, which holders receive bolt-shaped, aligned regions 7 of the backrest 1 such that the backrest 1 can be pivoted about the pivot axis formed by the bolt-shaped regions 7. Each of the lower holders 6 is provided with a suitable receptacle, into which the bolt-shaped region 7, which is formed on the shell 2, is received and is secured against axial displacement therein by the provision of a flange on the end side of the bolt-shaped region 7.

A rectangular opening 8 in the form of a hatch is formed in the backrest 1, it being possible for the hatch to serve for the transportation of long objects without the backrest 1 being folded over. The ribs 4 on the rear side of the shell 2 are arranged here in such a manner that an individual, encircling rib, referred to below as opening rib 4a, is arranged running around the opening 8. Said opening rib 4a is connected at the upper outside corner thereof to the supporting structure 4'. In this case, the opening rib 4a runs spaced apart somewhat from the opening 8 only in the upper region, said opening rib, in the present case, being arranged running on the outside seat side as an extension of the innermost rib 4b of the supporting structure 4', which rib encircles with interruptions. Furthermore, the opening rib 4a is guided further downward in the vertical direction on the inside.

As is apparent from FIG. 10, in each case (at least) three ribs 4 of the supporting structure 4' run substantially parallel to one another in the outer border region of the backrest 1, wherein the spacing of the ribs 4 on the side facing the center of the vehicle is smaller than on the other side. The outermost rib 4 serves here in particular to terminate the profile.

Encircling ribs 4 which are arranged further on the inside and run substantially parallel to one another are at least partially connected to one another via transverse ribs 4c. Furthermore, a fourth rib 4d is provided in the upper region above the region of the outside seat, which rib ends at a vertically running transverse rib 4c above the outside corner of the opening 8. In the two lower corners, the ribs 4 are guided further to the outside via transverse ribs 4c such that the ribs 4 intersect in order to reinforce the structure in the region of the lower connecting points, i.e. of the lower holders 6.

Furthermore, two reinforcing ribs 4" running substantially parallel to each other are provided somewhat above the diagonal from the lower outside as far as the upper center, and from the outside upper corner of the opening 8. Said reinforcing ribs 4" therefore run substantially diagonally over the contoured region of the outer seat and form an essential part of the supporting structure 4'. As is apparent from the drawing, in each case at least two spaced-apart ribs 4 running next to each other are provided in the region of the supporting structure 4', wherein transverse ribs 4c can be provided between said ribs. Transverse ribs 4c of this type are provided in particular at the outer ends of the supporting structure 4' and in the three corner regions in which the connecting points A are arranged. In the present case, a transverse connection between the ribs 4 is not provided at the corner without the connecting point, which is not integrated into the supporting structure 4'.

According to the backrest 1 described in the present case, the supporting structure 4' is designed to be open toward the rear side, but a completely or partially closed configuration may also be provided, in particular in the region between the ribs 4, to which a rear shell 3 may then optionally be fitted (see FIG. 10). It is possible for, for example, insulating material, such as foam, to be inserted into the cavities formed between the shell 2 and the rear shell 3. Furthermore, this region can be used for the arrangement of actuators, electric connections for a seat heating system, or the like.

Furthermore, a windup mechanism for a seatbelt (not illustrated) for the central seat is provided in the upper region on the rear side of the shell.

As can be seen by way of indication in FIG. 10, the upper outside corner of the shell 2 is designed as an upwardly open receptacle into which a backrest lock 12 is inserted. Ribs 4 of the supporting structure 4' are provided in the region in which a bracket of the upper holder 5, which is fixed on the vehicle structure, can be introduced into the backrest lock 12.

The materials of the base matrix of the shell and of the rear shell may differ, but the same materials are preferably used for the base matrix of the shell and for the rear shell. This is advantageous in particular in respect of a possible cohesive material joint between the shells.

Figure 13:
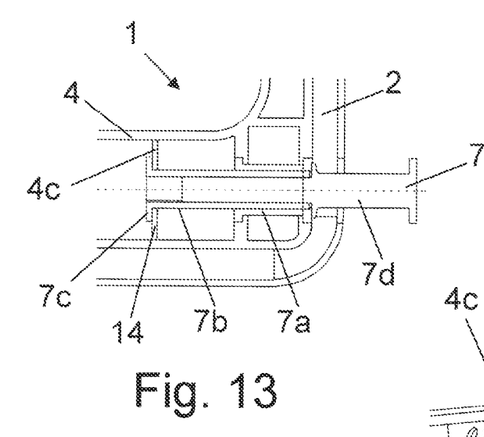
FIG. 13 shows a sectional illustration of the lower corner region of a backrest with a schematic illustration of the construction of a backrest connection.
Figure 14:
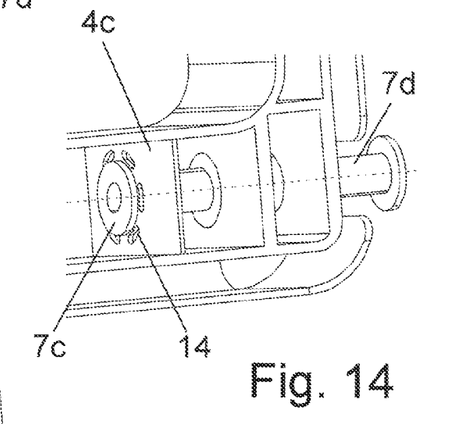
FIG. 14 shows a perspective illustration of the lower corner region corresponding to FIG. 13 before a deformation.
Figure 15:
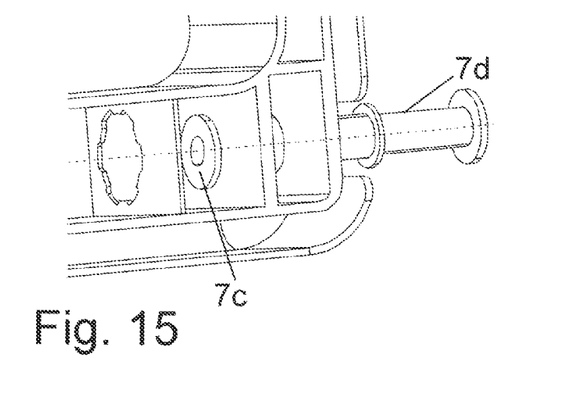
FIG. 15 shows the corner region from FIG. 14 after a plastic deformation.

Deformation of the bolt-shaped region 7, as illustrated in FIGS. 13 to 15, can be provided with a fixed holder, which is as dimensionally stable as possible even in the event of a crash, or optionally also in conjunction with a holder 6 which has predetermined deformation properties in the event of a crash.

For this purpose, in the lower corner region of the shell 2, a guide sleeve 7a having flange regions on the end side is embedded in the continuation of two vertically running ribs 4. The outermost rib 4 is interrupted in the region of the bolt-shaped region 7.

A threaded bushing 7b is arranged displaceably within the guide sleeve 7a. Said threaded bushing 7b extends further inward, beyond the guide sleeve 7a, as far as a transverse rib 4c arranged perpendicularly thereto. In the present case, the threaded bushing 7b ends more or less flush with the rib 4, which is arranged on the outside, adjacent to the bolt-shaped region 7. The threaded bushing 7d has a flange region 7c on the inside, i.e. on the end facing away from the bolt-shaped region 7. Said flange region 7c bears against said transverse rib 4c which is provided in addition to the continuations of the vertically running ribs 4. The transverse rib 4c is spaced apart somewhat further than the two ribs 4 and, in addition, in the present case has a somewhat smaller thickness.

A screw bolt 7d is screwed into the threaded bushing 7b, from the outside, through the interruption in the outermost rib 4, as far as a flange formed on the screw bolt 7d. The screw bolt 7d together with the outside end forms said protruding, bolt-shaped region 7 which can be positioned in a lower holder 6, as indicated in FIG. 10. The outer end of the screw bolt 7d can be connected both releasably and also fixedly to the vehicle structure by the holder 6, wherein the screw bolt 7d is fixed to the vehicle in the use position of the backrest.

As is apparent from FIG. 14, the transverse rib 4c in the adjacent region to the flange region 7c of the threaded bushing 7b is provided, in a manner running around said flange region, with a plurality of apertures forming a predetermined deformation point or predetermined breaking point 14. Of course, a different configuration of the predetermined deformation point or predetermined breaking point is also possible, for example by means of a perforation or by means of material weakening.

In the event of a head-on crash, with a seated person, the backrest 1 presses to the front with the guide sleeve 7a, the screw bolt 7d being connected fixedly to the vehicle structure. As a result, a moment about the vertical axis acts on the threaded bushing 7b and the screw bolt 7d. If the maximum permissible force is exceeded, in the present case 5 kN, the predetermined deformation point or predetermined breaking point breaks, and the threaded bushing 7b moves as far as the inside flange of the guide sleeve 7a, where it is stopped. As a result, the screw bolt 7d moves outward corresponding to the path of movement of the threaded bushing 7b, wherein a certain pivoting movement takes place about the vertical axis. In this case, the backrest 1 moves forward and at the same time arches about the vertical axis.

The predetermined deformation point or predetermined breaking point 14 behaves correspondingly also in the event of a head-on crash, with a load in the region behind the vehicle seat, which load presses onto the backrest 1. The predetermined deformation point or predetermined breaking point 14 can also behave correspondingly in the event of a rear crash, with a seated person.

A crash with complete breakage of the material at the predetermined deformation point or predetermined breaking point 14 is described above, but the predetermined deformation point or predetermined breaking point may also be designed in such a manner that only an at least partial plastic deformation of the material takes place without tearing, i.e. without breakage. A plastic deformation can also suitably damp the impact. Of course, a partial tearing may also be provided.

The above-described configuration of the predetermined deformation point or predetermined braking point 14 may also be used with a different backrest structure. In particular, the ribs may be formed on a rear shell instead of on a shell, or the rear shell may also be omitted, i.e. the backrest may also be of single-shell design. Furthermore, in addition to the abovementioned thermoplastics, other materials are also suitable, for example light metals, metals, for example steel, or composite materials.

Furthermore—given a corresponding configuration of the backrest and connection of same to the vehicle structure—a predetermined deformation point or predetermined breaking point of this type may also be arranged at a different location, i.e., for example, at the top instead of at the bottom, as described above.

The invention claimed is:

1. A backrest for a rear seat arrangement of a motor vehicle, comprising:
    a shell which has a width reaching over at least two seats, and has at least two lower and at least one upper connecting point,
        wherein the shell comprises:
        a first laterally extending side;
        a second laterally extending side;
        a first vertically extending side;
        a second vertically extending side; and
        a supporting structure which connects the connecting points to one another comprising: a first lateral supporting region extending substantially across an entire lateral extent of the first laterally extending side of the shell, wherein the first lateral supporting region is positioned proximate to the first laterally extending side;
            a first vertical supporting region extending substantially across an entire vertical extent of the first vertically extending side of the shell and forming an intersection with the first lateral supporting region, wherein the first vertical supporting region is positioned proximate to the first vertically extending side;
            a second lateral supporting region extending from the first vertical supporting region to an end at an intermediate position along a lateral extent of the second laterally extending side of the shell, wherein the second lateral supporting region is positioned proximate to the second laterally extending side;
            an oblique supporting region extending from the intersection of the first lateral supporting region and the first vertical supporting region to the end of the second lateral supporting region; and
        one or more ribs which combine to surround a perimeter of the shell, the shell defining an opening between the end of the second lateral supporting region and the second vertically extending side.

2. The backrest as claimed in claim 1, wherein the regions are formed by ribs which project to the rear.

3. The backrest as claimed in claim 1, wherein the shell has a profile which is rearwardly open at least in the regions, and wherein a rear shell is attachable to the shell, the rear shell closing the rearwardly open profile of the shell.

4. The backrest as claimed in claim 1, wherein the shell is formed from a base matrix comprising thermoplastic with short fiber reinforcement.

5. The backrest as claimed in claim 1, wherein the supporting structure has an endless fiber reinforcement.

6. The backrest as claimed in claim 5, wherein the endless fiber reinforcement comprises endless fibers which are embedded into a base matrix of the shell.

7. The backrest as claimed in claim 1, wherein an insert composed of a long and/or endless fiber reinforced plastic and/or a metal is embedded into a base matrix, and/or in that the semifinished product is surrounded at least in regions by the base matrix.

8. The backrest as claimed in claim 7, wherein the insert is formed by a tube of C-shaped design.

9. The backrest as claimed in claim 7, wherein the metal comprises steel.

10. The backrest as claimed in claim 7, wherein the insert forms at least one bolt-shaped region which is configured to engage with a holder.

11. The backrest as claimed in claim 8, wherein the tube comprises a rolled tube.

12. The backrest as claimed in claim 1, wherein at least one bolt-shaped region in the shape of a rotary bearing bolt is formed on the shell.

13. The backrest as claimed in claim 1, wherein the shell has a receptacle for a backrest lock in an area of the upper connecting point.

14. The backrest as claimed in claim 1, wherein the opening is bordered on a rear side of the shell by at least one rib which is connected to the supporting structure.

15. The backrest as claimed in claim 1, wherein the oblique supporting region of the supporting structure is formed by two reinforcing ribs running spaced apart next to each other, a windup mechanism for a seatbelt being arrangeable at the upper end between the reinforcing ribs.

16. The backrest as claimed in claim 1, wherein the shell is formed from a base matrix comprising thermoplastic with a long fiber reinforcement.

17. The backrest as claimed in claim 1, wherein the shell is formed from a base matrix comprising thermoplastic with a long and short fiber reinforcement.

* * * * *